(12) United States Patent
Che et al.

(10) Patent No.: US 8,448,175 B2
(45) Date of Patent: May 21, 2013

(54) DEADLOCK DETECTION IN A PARALLEL PROGRAM

(75) Inventors: Yang Che, Beijing (CN); Li-Fang Lee, Rochester, MN (US); Yao Qi, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 12/915,127

(22) Filed: Oct. 29, 2010

(65) Prior Publication Data

US 2011/0107151 A1    May 5, 2011

(30) Foreign Application Priority Data

Oct. 30, 2009   (CN) .......................... 2009 1 0209076

(51) Int. Cl.
*G06F 9/46* (2006.01)
(52) U.S. Cl.
USPC .......................................... 718/102; 714/38.1
(58) Field of Classification Search
None
See application file for complete search history.

(56) References Cited

U.S. PATENT DOCUMENTS

| | | | | |
|---|---|---|---|---|
| 5,590,335 A * | 12/1996 | Dubourreau et al. | ......... | 718/104 |
| 5,764,976 A * | 6/1998 | Hsiao | ................... | 1/1 |
| 5,835,766 A * | 11/1998 | Iba et al. | ....................... | 718/104 |
| 6,009,269 A | 12/1999 | Burrows et al. | | |
| 6,173,308 B1 * | 1/2001 | Hilditch et al. | ............... | 718/106 |
| 6,253,273 B1 * | 6/2001 | Blumenau | .................... | 710/200 |
| 6,449,614 B1 * | 9/2002 | Marcotte | ............................ | 1/1 |
| 6,574,654 B1 * | 6/2003 | Simmons et al. | ............. | 718/104 |
| 6,704,767 B1 * | 3/2004 | Simmons et al. | ............. | 718/104 |
| 6,807,540 B2 * | 10/2004 | Huras et al. | ................... | 719/317 |
| 6,983,461 B2 * | 1/2006 | Hutchison et al. | ............ | 718/104 |
| 7,073,176 B1 * | 7/2006 | Simmons et al. | ............. | 718/104 |
| 7,124,405 B1 * | 10/2006 | Kakivaya et al. | .............. | 717/143 |
| 7,137,120 B2 * | 11/2006 | Armstrong et al. | ........... | 718/107 |
| 7,185,339 B2 * | 2/2007 | Srivastava et al. | ............. | 718/104 |
| 7,496,918 B1 * | 2/2009 | Dice et al. | ..................... | 718/100 |
| 7,519,965 B2 * | 4/2009 | Yoshida et al. | ................ | 718/100 |
| 2003/0023656 A1 * | 1/2003 | Hutchison et al. | ............ | 709/100 |
| 2004/0025164 A1 * | 2/2004 | Ma et al. | ....................... | 718/107 |
| 2006/0206901 A1 * | 9/2006 | Chan | ............................. | 718/107 |
| 2006/0218534 A1 * | 9/2006 | Kahlon et al. | ................ | 717/124 |

(Continued)

OTHER PUBLICATIONS

S. Bensalem and K. Havelund, "Dynamic deadlock analysis of multi-threaded programs" in Proc PADTAD Track IBM Verification Conf, Haifa, Israel, Nov. 13-16, 2005, pp. 208-223.*

(Continued)

*Primary Examiner* — Emerson Puente
*Assistant Examiner* — Mehran Kamran
(74) *Attorney, Agent, or Firm* — Yee & Associates, P.C.; Jeffrey S. LaBaw

(57) ABSTRACT

A method and system of deadlock detection in a parallel program, the method comprising: recording lock events during the operation of the parallel program and a first order relation among the lock events; converting information relevant to the operation of the parallel program into gate lock events and recording the gate lock events; establishing a second order relation among the gate lock events and lock events associated with the gate lock events and adding the second order relation to the first order relation; constructing a lock graph corresponding to the operation procedure of the parallel program based on the added first order relation; and performing deadlock detection on the constructed lock graph. The deadlock detection method of the invention can improve the accuracy of deadlock detection without depending on the deadlock detection algorithm per se, and can be applied with facility to various development environments and reduce development costs.

15 Claims, 3 Drawing Sheets

U.S. PATENT DOCUMENTS

| | | | |
|---|---|---|---|
| 2007/0143766 A1* | 6/2007 | Farchi et al. | 718/104 |
| 2007/0288939 A1* | 12/2007 | Stall | 719/328 |
| 2008/0184252 A1* | 7/2008 | Leeman | 718/104 |
| 2008/0209422 A1* | 8/2008 | Coha | 718/102 |
| 2008/0263549 A1* | 10/2008 | Walker | 718/100 |
| 2009/0235002 A1* | 9/2009 | Nir-Buchbinder et al. | 710/240 |

OTHER PUBLICATIONS

K. Havelund, "Using runtime analysis to guide model checking of Java programs," in Proc. SPIN Model Checking Softw. Verification, Standford, CA Aug. 30-Sep. 1, 2000, pp. 245-264.*

Eugster, "Java Virtual Machine with Rollback Procedure allowing Systematic and Exhaustive Testing of Multi-threaded Java programs", Mar. 31, 2003, 175 pages, Formal Methods Group, Computer Science Institute, ETH Zurich.

Rutar et al., "A Comparison of Bug Finding Tools for Java", Proceedings of the 15th International Symposium on Software Reliability Engineering, pp. 245-256, 2004.

Joshi et al., "A Randomized Dynamic Program Analysis Technique for Detecting Real Deadlocks", PLDI'09, Jun. 2009, Dublin Ireland, pp. 1-11.

Artho et al., "Experiments with Test Case Generation and Runtime Analysis", 2003, Proceedings of the abstract state machines 10th international conference on Advances in theory and practice, Taormina, Italy , pp. 87-108.

Bensalem et al., "Confirmation of Deadlock Potentials Detected by Runtime Analysis", Otioco, Jul. 2006, Portland Maine, ACM, pp. 1-9.

* cited by examiner

DEADLOCK DETECTION IN A PARALLEL PROGRAM

BACKGROUND

1. Field:

The present invention relates to a parallel program, and more specifically, relates to a method and system of deadlock detection in a parallel program.

2. Description of the Related Art

Process (thread) deadlock in a parallel program is a very fatal problem. Process (thread) deadlock refers to a phenomenon in which two or more processes (threads) wait for each other due to contention for a shared resource during operation thereof, and unless a process (thread) in a deadlock gives up the shared resource, the two transactions in the deadlock will wait indefinitely. Process (thread) deadlock generally will result in paralysis of the entire system. There are many factors triggering process (thread) deadlock, mainly comprising: (1) limited system resources; (2) an unsuitable order of advancing the operation of the processes (threads); and (3) inappropriate resource distribution. If the system has sufficient resources, the resource request from each process can be satisfied, and possibility of an occurrence of the deadlock is very low; otherwise, the process will get into a deadlock due to contention for limited resources. Secondly, if the order of advancing the operation of the processes is different from the speed thereof, a deadlock may occur. In order to avoid heavy damages to the entire system caused by process (thread) deadlock and to improve stability of the system, an effective method of deadlock detection is needed so as to find a process (thread) deadlock in time and take suitable measures for releasing from the deadlock, thereby avoiding further deterioration of the operating situation of the system.

The problem of deadlock detection is resolved generally based on deadlock detection algorithms in graph theory, which constructs a graph visually representative of the situation in a deadlock, e.g. a lock graph and a resource distribution graph, by recording lock events during operation of the parallel program. In the graph, a node represents a lock of a resource, and a directed edge from one node to another node represents that a process that has acquired the lock of one resource is requesting to acquire the lock of another resource. If directed edges between two or more nodes in the graph form a closed directed loop, this indicates that there is a deadlock in the parallel program, and therefore the deadlock can be detected by checking if there is a directed loop in the graph.

When assessing the performance of a deadlock detection algorithm, pseudo-deadlock rate is regarded as an important index. In the actual applications, if the pseudo-deadlock rate is excessively high, a lot of time and energy of the testers are often consumed for finding a true deadlock, so it is extremely important for deadlock detection to reduce the pseudo-deadlock rate. At present, research is conducted for improving the algorithms to reduce the pseudo-deadlock rate, but the improvements of the algorithms in theory do not have universality in the actual applications. Even if adopting the same algorithm, adaptive adjustment shall be made to the algorithm with respect to specific application environments and products, which requires the testers and developers to know the kernel of the algorithm very much such that it is possible for them to modify the codes of the algorithm directed to different environments. However, in actual applications, there exist great risks for the modifications to the kernel of the algorithm, and moreover, it is bad for the transplantation of the codes for the algorithm. Therefore, an improved deadlock detection method is needed, which can be applied with facility to various development environments, and can improve the accuracy of deadlock detection without depending on the deadlock detection algorithm per se and reduce the development costs.

SUMMARY

In view of the above problems, the present invention provides a method and system of deadlock detection in a parallel program.

According to an aspect of the invention, a method of deadlock detection in a parallel program is provided, comprising: recording lock events during the operation of the parallel program and a first order relation among the lock events; converting information relevant to the operation of the parallel program into gate lock events and recording the gate lock events; establishing a second order relation among the gate lock events and lock events associated with the gate lock events and adding the second order relation to the first order relation; constructing a lock graph corresponding to the operation procedure of the parallel program based on the added first order relation; and performing deadlock detection on the constructed lock graph.

According to another aspect of the invention, a system of deadlock detection in a parallel program is provided, comprising: a recording module for recording lock events during the operation of the parallel program and a first order relation among the lock events; a converting module for converting information relevant to the operation of the parallel program into gate lock events and recording the gate lock events; an establishing module for establishing a second order relation among the gate lock events and lock events associated with the gate lock events and adding the second order relation to the first order relation; a lock graph constructing module for constructing a lock graph corresponding to the operation procedure of the parallel program based on the added first order relation; and a deadlock detecting module for performing deadlock detection on the constructed lock graph.

The deadlock detection method and system of the invention can be applied with facility to various development environments, can improve the accuracy of deadlock detection without depending on the deadlock detection algorithm per se and reduce development costs.

BRIEF DESCRIPTION OF THE SEVERAL VIEWS OF THE DRAWINGS

With reference to the accompanying drawings, the invention per se, and preferred embodiments, object and advantages of the invention can be better understood by referring to the following detailed descriptions of exemplary embodiments, wherein.

DETAILED DESCRIPTION

The method and system of deadlock detection for a parallel program according to the embodiments of the invention are described below in combination with the accompanying drawings. A basic idea of the invention is to utilize a rule universally applied to the existing deadlock detection algorithms as follows: in the lock graph, if all the nodes forming a deadlock share a same gate lock, the deadlock is not a true deadlock. The gate lock is defined as follows: the deadlock detection algorithm must further consider a third lock that protects the deadlock, wherein if this lock is the lock to be acquired first before acquiring two other locks, then the third lock is called the gate lock. A theoretical basis of the rule is that, since a cyclical waiting condition in the deadlock forming condition requires that the respective locks forming the deadlock only have a unique executing order, the deadlock cannot be formed if the executing order is destroyed. For example, three locks A, B and C form a deadlock. Only a unique executing order among A, B and C will result in a deadlock, that is, A is waiting for a resource that is being used by B, B is waiting for a resource that is being used by C, and C is waiting for a resource that is being used by A. Once the executing order is destroyed, a deadlock will not be formed. For instance, if the locks A, B and C share one gate lock G, since for a different thread, it should first operate the gate lock when it intends to operate the lock A, B or C, the deadlock order is destroyed and a deadlock is not formed. The invention utilizes this rule to convert information relevant to the operation of the parallel program into gate locks, and thereby identify a pseudo-deadlock by using the existing deadlock detection algorithm to improve the accuracy of deadlock detection.

Figure 1:
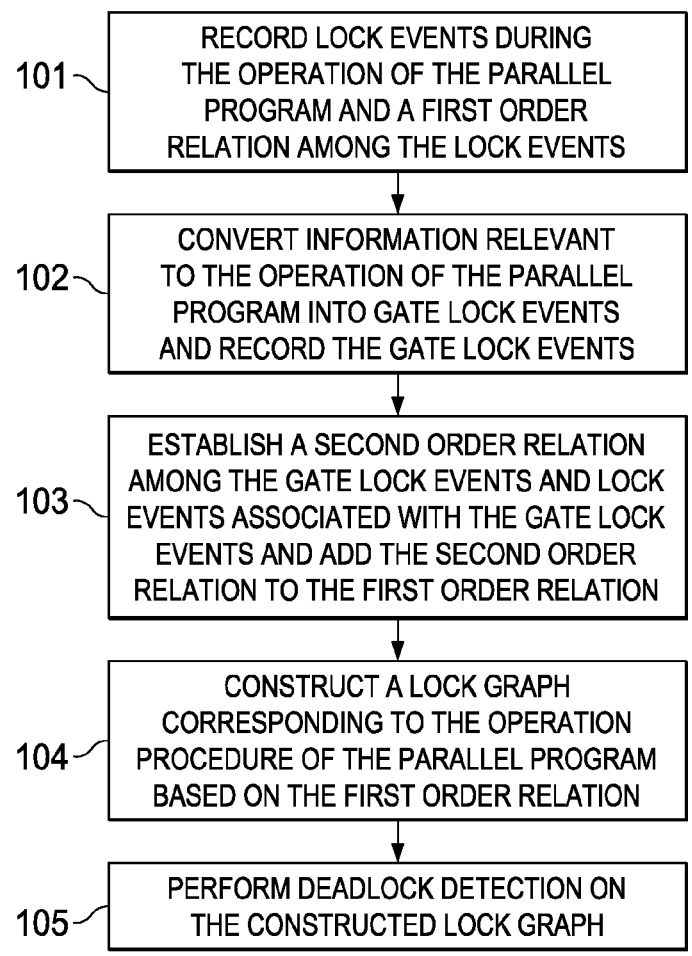
FIG. 1 shows a method of deadlock detection for a parallel program according to embodiments of the invention.

FIG. 1 shows the method of deadlock detection in a parallel program according to the embodiments of the invention comprising: a step 101 of recording lock events during the operation of the parallel program and a first order relation among the lock events, wherein in Java environment, lock events during the operation of the parallel program can be acquired by inserting a trace code following the lock operation with a byte code inserting technique, and a unique ID is assigned to each of the lock events, and the lock events and the first order relation among the lock events are stored in a memory by using the assigned IDs.

The method further comprises: a step 102 of converting information relevant to the operation of the parallel program into gate lock events and recording the gate lock events. Specifically, the information relevant to the operation of the parallel program can be obtained by modifying codes of the parallel program, for example, in a Java environment, the information relevant to the operation of the parallel program is obtained by inserting a trace code into the codes of the parallel program with the byte code inserting technique. The information relevant to the operation of the parallel program may be thread relevant information, program logic relevant information, or a combination thereof, wherein the thread relevant information may be thread identification information, thread creation information, or synchronization information among threads. For example, a postLock object is defined, wherein the postLock object comprises lock information, executing method information, and thread information required by the invention. In a method "public static synchronized void postLockAcquire (Object objectLocked, Class lockingClass, int lineNum, String methodInfo)", in addition to the lock information and the executing method information, the embodiments of the invention obtain information of the current thread by using a common function Thread.currentThread( ) add the thread information to the postLock object, store the postLock object in a data structure of a linked list, assign a unique ID to each of the gate lock events, and store the gate lock events in the memory by use of the assigned IDs.

The method further comprises a step 103 of establishing a second order relation among the gate lock events and lock events associated with the gate lock events and adding the second order relation to the first order relation, wherein the second order relation among the gate lock events and the associated lock events is determined according to the first order relation among the lock events during the operation of the parallel program.

According to an embodiment of the invention, the information relevant to the operation of the parallel program comprises thread creation information including information of a parent thread and information of a child thread, wherein establishing the second order relation among the gate lock events and the associated lock events comprises: acquiring by the parent thread a first set of lock events before creating the child thread; acquiring by the child thread a second set of lock events; acquiring a third set of lock events that is an intersection of the first set of lock events and the second set of lock events; and establishing an order relation among the thread creation information and the lock events in the third set of lock events.

According to an embodiment of the invention, the information relevant to the operation of the parallel program comprises thread identification information, wherein establishing the second order relation among the gate lock events and the associated lock events further comprises: establishing an order relation among the thread identification information and the lock events acquired by the threads identified by the thread identification information.

According to an embodiment of the invention, the information relevant to the operation of the parallel program comprises synchronization information among threads, which includes information of a notification thread and information of a wait thread, wherein establishing the second order relation among the gate lock events and the associated lock events further comprises: acquiring a first set of lock events by the notification thread before issuing a notification; acquiring by the wait thread a second set of lock events after receiving the notification; acquiring a third set of lock events that is an intersection of the first set of lock events and the second set of lock events; and establishing an order relation among said synchronization information among threads and lock events in the third set of lock events.

According to an embodiment of the invention, the information relevant to the operation of the parallel program comprises program logic information, wherein establishing the second order relation among the gate lock events and the associated lock events further comprises: acquiring a first set of lock events by a portion of the parallel program that is executed first as determined by the program logic information; acquiring a second set of lock events by a portion of the parallel program that is executed later as determined by the program logic information; acquiring a third set of lock events that is an intersection of the first set of lock events and the second set of lock events; and establishing an order relation among the program logic information and lock events in the third set of lock events.

Those skilled in the art would appreciate that the invention has illustratively given specific embodiments about the information relevant to the operation of the parallel program. The embodiments can be carried out separately or one or more of them can be combined to be carried out, and the latter could better improve the accuracy of deadlock detection.

The method further comprises: a step 104 of constructing a lock graph corresponding to the operation procedure of the parallel program based on the added first order relation, wherein the gate lock nodes converted from the information relevant to the operation of the parallel program and the directed edges established between the gate lock nodes and the associated lock events are added to the lock graph; and a step 105 of performing deadlock detection on the constructed lock graph. Deadlock detection is performed on the constructed lock graph by using the existing deadlock detection algorithms. Since the existing deadlock detection algorithms have a universally applied rule of "if all the nodes forming the deadlock share a same gate lock, the deadlock is not a true deadlock", a pseudo-deadlock protected by the gate lock converted from the information relevant to the operation of the parallel program is identified by utilizing this rule, so as to improve the accuracy of deadlock detection.

According to the embodiments of the invention, in order to further improve the accuracy of deadlock detection, deadlock detection results are further filtered based on the following rule: if at least any two nodes in a loop of a detected deadlock share one gate lock, it is determined that the detected deadlock is not a true deadlock. A theoretical basis of the rule is that, since there is a cyclical waiting condition in the deadlock forming condition, if three locks A, B and C form a deadlock, only a unique executing order among A, B and C will result in a deadlock, that is, A is waiting for a resource that is being used by B, B is waiting for a resource that is being used by C, and C is waiting for a resource that is being used by A. Once the executing order is destroyed, a deadlock will not be formed. For instance, if the locks A and C share one gate lock G, when B is waiting for the resource that is being used by C, since there exists the gate lock G, the case where C is waiting for the resource that is being used by A will not occur (since once G is acquired, A will wait until G is released), and the deadlock order is destroyed, so a deadlock cannot be formed.

The embodiments of the invention are now described by taking Java for example. Of course, the invention is not limited to Java environment, but is also applied to other object-oriented language environments or other programming language environments. An example of deadlock detection on program codes example1 by using the method according to the embodiments of the invention are shown blow.

```
01 : class T4 extends Thread{
02 : Object l1;
03 : Object l2;
04 : public T4 (Object l1, Object l2){
05 :    this.l1 = l1;
06 :    this.l2 = l2;
07 : }
08 : public void run( ){
09 :    synchronized (l1){
10 :       synchronized (l2){
11 :       }
12 :    }
```

-continued

```
13 :    }
14 : }
15 : class T5 extends Thread {
16 : Object l1;
17 : Object l2;
18 : Object l3;
19 : public T5 (Object l1, Object l2, Object l3){
20 :    this.l1 = l1;
21 :    this.l2 = l2;
22 :    this.l3 = l3;
23 : }
       @Override
24 : public void run( )
25 :    {
26 :       synchronized (l1){
27 :       synchronized (l2){
28 :       }
29 :    }
30 :       synchronized (l2){
31 :       synchronized (l3){
32 :       }
33 :    }
34 : }
35 : }
36 : public void harness3( ) throws InterruptedException{
37 :    01:Object l1 = new Object( );
38 :    02:Object l2 = new Object( );
          // main thread acquire lock l1 and lock l2;
39 :    03 :synchronized (l1){
40 :    04 :synchronized (l2){
41 :       }
42 :    }
43 : Thread t = new T4(l2, l1);
          //when T4 starts execution, thread T4 will
acquire lock l2 and lock l1
44 : t.start( );// create thread T4
45 : t.join( );// wait for thread T4 terminated.
46 : }
47 : public void harness4 ( ) throws InterruptedException{
48 :    Object l1 = new Object( );
49 :    Object l2 = new Object( );
50 : synchronized (l1){
51 :       synchronized (l2){
52 :       }
53 :    }
54 :    synchronized (l2){
55 :       synchronized (l1){
56 :       }
57 :    }
58 : }
```

Figure 2A:
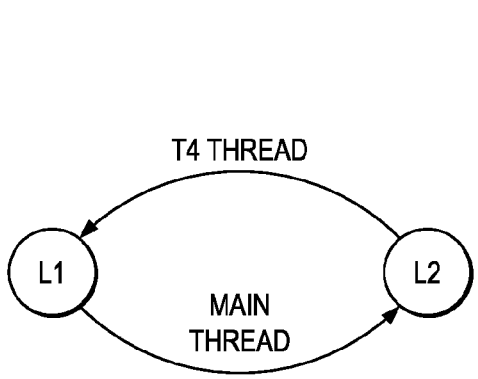
FIG. 2a shows a lock graph constructed for a first embodiment by using an existing deadlock detection method.
Figure 2B:
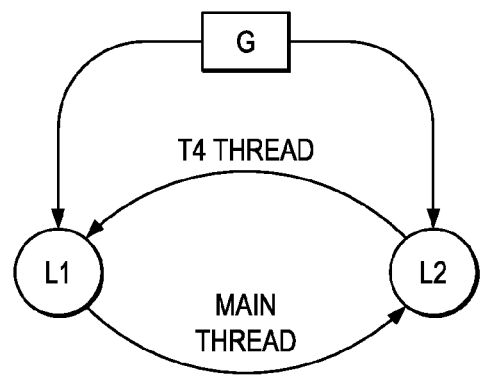
FIG. 2b shows a lock graph re-constructed for the first embodiment according to the method of the embodiments of the invention.

By taking the function harness3 as a first embodiment, a procedure of performing deadlock detection by using thread creation information according to the method of the first embodiment of the invention is described below. According to the existing deadlock detection methods, an order relation among the lock events during the operation of the parallel program is recorded, wherein a parent thread main has acquired the lock of the resource L1 and requests for the lock of the resource L2, and a child thread t4 has acquired the lock of the resource L2 and requests for the lock of the resource L1. FIG. 2*a* shows a lock graph constructed for the first embodiment by using the existing deadlock detection methods. As shown in the graph, the locks L1 and L2 form a directed loop in the deadlock state. However, considering the thread creation relation, it can be judged that the directed loop is not a true deadlock, because the child thread t4 has not created yet when the parent thread main operates the locks L1 and L2, and the locks L1 and L2 are operated by the child thread t4 only after it is created by the parent thread main, so in fact, the deadlock does not exist. The embodiment of the invention is specifically as follows: recording lock events during the operation of the parallel program and an order relation among the lock events; inserting a trace code in the vicinity of the thread creation code t.start by using the byte code modification technique to thereby obtain information of the parent thread main and the creation of the child thread t4, and converting the information of the creation of the child thread t4 by the parent thread main into a gate lock event G and recording it, and more specifically, assigning a unique ID for each of the recorded gate lock events and lock events, and storing the lock events and the order relation among the lock events as well as the gate lock events G in the memory by using the assigned IDs. Since it can be determined that both the main thread and the thread t4 operate the locks L1 and L2, an order relation among the gate lock G and the locks L1 and L2 is added to the memory, that is, for different threads, first acquiring the gate lock G and then acquiring the locks L1 and L2. A lock graph corresponding to the operation procedure of the parallel program is constructed according to the contents stored in the memory. FIG. 2b shows a lock graph re-constructed for the first embodiment according to the method of the invention. As shown in the graph, the relation of creating the child thread t4 by the parent thread main is added to the lock graph as a gate lock G, and directed edges are established from the lock G to the locks L1 and L2, respectively. According to the existing deadlock detection algorithms, the loop formed by the locks L1 and L2 is protected by the lock G and thus a deadlock is not formed, because for a different thread, it operates the lock G first when it intends to operate the locks L1 and L2. In this way, when a thread first enters the lock G, it can operate the locks L1 and L2 exclusively, and a deadlock cannot be formed due to contention for the locks with other threads, and thus the existing deadlock detection algorithm will not report that the locks L1 and L2 form a deadlock. Further, preliminary deadlock detection results are filtered based on the following rule: if at least any two directed edges of a detected deadlock share one gate lock, the detected deadlock is not a true deadlock, so as to further improve the accuracy of deadlock detection.

Figure 3A:
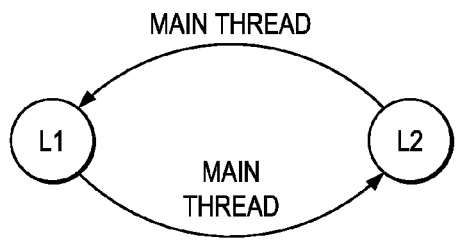
FIG. 3a shows a lock graph re-constructed for a second embodiment by using an existing deadlock detection method.
Figure 3B:
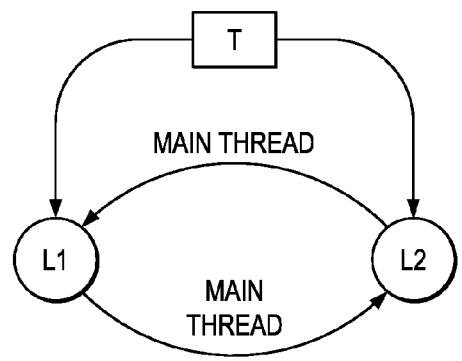
FIG. 3b shows a lock graph re-constructed for the second embodiment according to the method of the invention.

By taking a function harness4 as a second embodiment, a procedure of performing deadlock detection by using thread identification information according to the method of the second embodiment of the invention is described below. According to the existing deadlock detection method, an order relation among the lock events during the operation of the parallel program is recorded, wherein the thread main has acquired the lock of the resource L1 and requests for the lock of the resource L2, and the thread main has acquired the lock of the resource L2 and requests for the lock of the resource L1, and a lock graph is constructed according to the recorded lock events. FIG. 3a shows a lock graph constructed for the second embodiment by using the existing deadlock detection methods. As shown in the graph, the locks L1 and L2 form a directed loop in the deadlock state. However, considering the thread identification information, it can be judged that the directed loop is not a true deadlock, because the two directed edges both belong to the same one thread main and a deadlock will not occur in the same one thread. The embodiment of the invention is as follows: recording lock events during the operation of the parallel program and an order relation among the lock events; inserting a trace code in the vicinity of the lock events by using the byte code modification technique to thereby obtain the thread identification information main of the lock events, and converting the thread main into a gate lock event T and recording it, and more specifically, assigning a unique ID for each of the lock events and the recorded gate lock event, and storing the lock events and the order relation among the lock events as well as the converted gate lock event T in the memory by using the assigned IDs. Since it can be determined that the operations of acquiring the locks L1 and L2 all are performed in the thread main, an order relation among the thread main and the acquired locks L1 and L2 is recorded in the memory, that is, for different threads, first acquiring the gate lock T and then acquiring the locks L1 and L2. Next, a lock graph corresponding to the operation procedure of the parallel program is constructed according to the contents stored in the memory. FIG. 3b shows a lock graph re-constructed for the second embodiment according to the method of the invention. As shown in the graph, the thread main is added to the lock graph as a gate lock T, and directed edges are established from the gate lock T to the locks L1 and L2, respectively. According to the existing deadlock detection algorithms, the loop formed by the locks L1 and L2 is protected by the gate lock T and thus a deadlock is not formed, because for a different thread, it operates the lock T first when it intends to operate the locks L1 and L2. In this way, when a thread first enters the lock T, it can operate the locks L1 and L2 exclusively, and a deadlock is not formed due to contention for the locks with other threads, and thus the existing deadlock detection algorithms will not report that the locks L1 and L2 form a deadlock. Further, preliminary deadlock detection results are filtered and if at least any two directed edges of a detected deadlock share one gate lock, the detected deadlock is not a true deadlock, so as to further improve the accuracy of deadlock detection.

A third embodiment of assistant deadlock detection on program codes example2 by using the synchronization information among threads is shown below.

```
01: Thread T5
02: c.wait( );
03: lock (l1);
04: lock (l2);
05: unlock (l2);
06: unlock (l1);
07: Thread T6
08: lock (l2);
09: lock (l1);
10: unlock (l1);
11: unlock (l2);
12: c.notify( );
```

Figure 4A:
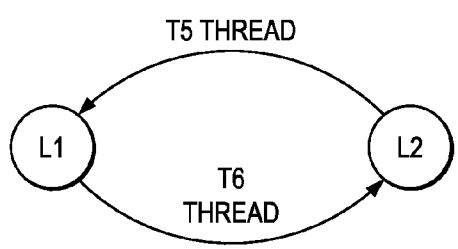
FIG. 4a shows a lock graph re-constructed for a third embodiment by using an existing deadlock detection method.
Figure 4B:
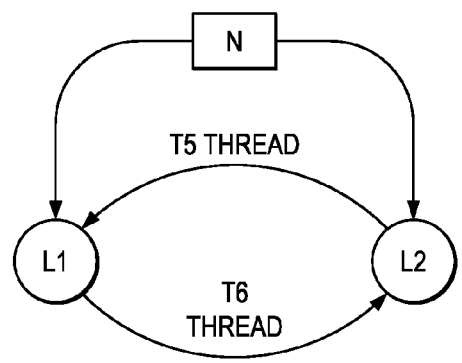
FIG. 4b shows a lock graph re-constructed for the third embodiment according to the method of the invention.

According to the existing deadlock detection methods, an order relation among the lock events during the operation of the parallel program is recorded, wherein a thread T5 has acquired the lock of the resource L1 and requests for the lock of the resource L2, and a thread T6 has acquired the lock of the resource L2 and requests for the lock of the resource L1, so a directed loop in a deadlock state is formed. FIG. 4a shows a lock graph constructed for the third embodiment according to the existing deadlock detection methods. However, considering synchronization information among threads, it can be judged that the directed loop is not a true deadlock, because the thread T5 will not perform the lock operation before a notification from the thread T6 but is in a waiting condition, the thread T5 is notified after the thread T6 completes the lock operation, and then the thread T5 starts performing the lock operation, so the deadlock will not occur. The embodiment of the invention is as follows: recording lock events during the operation of the parallel program and an order relation among the lock events; and obtaining synchronization information among the threads, i.e., the thread T5 waiting for the thread T6, by modifying the codes of the parallel program, and converting the thread T5 waiting for the thread T6 into a gate lock event N and recording it, and more specifically, assigning a unique ID for each of the recorded gate lock event N and the lock events, and storing the lock events and the order relation among the lock events as well as the converted gate lock event N in the memory by using the assigned IDs. Since it can be determined that the locks L1 and L2 are operated both before T6 notifies T5 and after T5 receives the notification from T6, an order relation among the gate lock N and the locks L1 and L2 is stored in the memory, that is, for different threads, first acquiring the gate lock N and then acquiring the locks L1 and L2. FIG. 4b shows a lock graph re-constructed for the third embodiment according to the method of the invention. As shown in the graph, the thread T5 waiting for the thread T6 is added to the lock graph as a gate lock N, and directed edges are established from the gate lock N to the locks L1 and L2, respectively. According to the existing deadlock detection algorithms, the loop formed by the locks L1 and L2 is protected by the gate lock N and thus a deadlock is not formed, because for a different thread, it operates the lock N first when it intends to operate the locks L1 and L2. In this way, when a thread first enters the gate lock N, it can operate the locks L1 and L2 exclusively, and a deadlock is not formed due to contention for the locks with other threads, and thus the existing deadlock detection algorithms will not report that the locks L1 and L2 form a deadlock. Further, preliminary deadlock detection results are filtered based on the following rule: if at least any two directed edges of a detected deadlock share one gate lock, it is determined that the detected deadlock is not a true deadlock, so as to further improve the accuracy of deadlock detection.

A fourth embodiment of deadlock detection on program codes example3 by using the program logic information is shown below.

```
01 : public class ComponentDispatcher {
02 :    private Object L1=new Object( );
03 :    private Object L2= new Object( );
04 :    private boolean initSuccess = false;
05 :    public static void main(String[ ] args){
06 :       new ComponentDispatcher( ).dispatchTasks( );
07 : }
08 :    public void dispatchTasks( ){
09 : initialization( );
10 : while(true){
11 :             if(initSuccess){
12 :             Thread t2 = new Thread(new Component2( ));
13 :             t2.start( );
14 :             break;
15 :       }
16 :    }
17 : }
18 : public void initialization( ){
19 :    Thread t1 = new Thread(new Component1( ));
20 :    t1.start( );
21 : }
22 : class Component1 implements Runnable {
23 :    public void run( ) {
24 :    synchronized(L1){
25 :             synchronized(L2){
26 :                      }
27 :       }
28 :    }
29 : init=true;
30 : }
31 : class Component2 implements Runnable {
32 : public void run( ) {
33 :    synchronized(L2) {
34 :             synchronized(L1){
35 :       }
36 :    }
37 :    }
38 :    }
39 : }
```

Figure 5A:
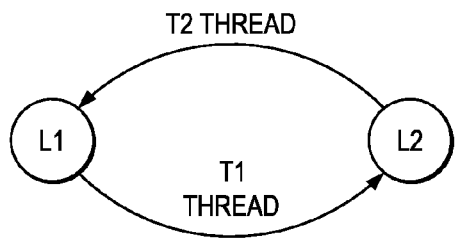
FIG. 5a shows a lock graph re-constructed for a fourth embodiment by using an existing deadlock detection method.
Figure 5B:
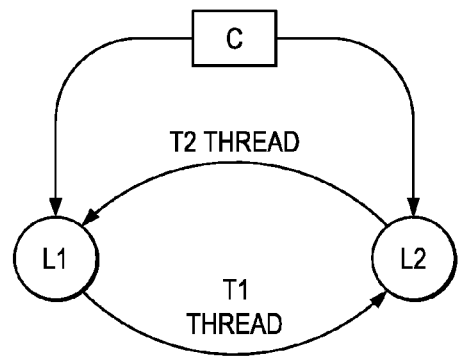
FIG. 5b shows a lock graph re-constructed for the fourth embodiment according to the method of the invention.

According to the existing deadlock detection method, an order relation among the lock events during the operation of the parallel program is recorded, wherein a thread T1 has acquired the lock of the resource L1 and requests for the lock of the resource L2, and a thread T2 has acquired the lock of the resource L2 and requests for the lock of the resource L1, so a directed loop in the deadlock state is formed. FIG. 5a shows a lock graph constructed for the fourth embodiment by using the existing deadlock detection methods. However, considering the logic order of module initialization, it can be judged that the directed loop is not a true deadlock, because it is designed in the program logic that Component 1 must finish its work before the start of Component 2, which results in that Component 2 has not started yet while Component 1 operates the locks L1 and L2 in the thread T1, and initSuccess is set to be true only after Component 1 finishes the operation of the locks L1 and L2, and at this time Component 2 can be started. Then, Component 2 starts operating the locks L2 and L1 in the thread T2. The embodiment of the invention is as follows: recording lock events during the operation of the parallel program and an order relation among the lock events; obtaining the program logic order, i.e., the initialization order of Component 1 and Component 2 in the program logic, by modifying codes of the parallel program; and converting the initialization order of Component 1 and Component 2 in the program logic into a gate lock C and recording it, and more specifically, assigning a unique ID for each of the recorded gate lock event N and lock events, and storing the lock events and the order relation among the lock events as well as the converted gate lock event N in the memory by using the assigned IDs. Since it can be determined that Component 1 and Component 2 both operate the locks L1 and L2, an order relation among the gate lock C and the locks L1 and L2 is stored in the memory, that is, for different threads, first acquiring the gate lock C and then acquiring the locks L1 and L2. FIG. 5b shows a lock graph re-constructed for the fourth embodiment according to the method of the invention. As shown in the graph, the initialization order of Component 1 and Component 2 in the program logic is added to the lock graph as a gate lock C, and directed edges are established from the gate lock C to the locks L1 and L2, respectively. According to the existing deadlock detection algorithm, the loop formed by the locks L1 and L2 is protected by the gate lock C and thus a deadlock is not formed, because for a different thread, it operates the lock C first when it intends to operate the locks L1 and L2. In this way, when a thread first enters the gate lock C, it can operate the locks L1 and L2 exclusively, and a deadlock is not formed due to contention for the locks with other threads, and thus the existing deadlock detection algorithms will not report that the locks L1 and L2 form a deadlock. Further, preliminary deadlock detection results are filtered and if at least any two directed edges of a detected deadlock share one gate lock, the detected deadlock is not a true deadlock, so as to further improve the accuracy of deadlock detection.

Figure 6:
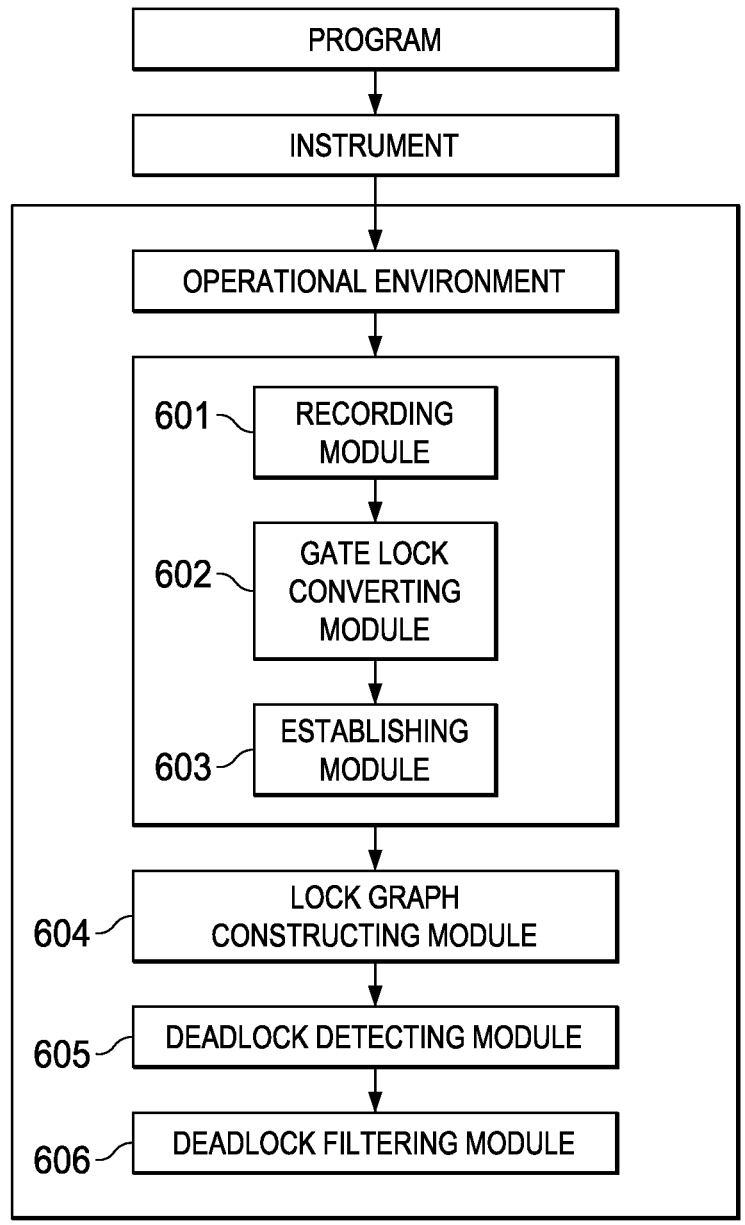
FIG. 6 shows a system of deadlock detection for a parallel program according to the embodiments of the invention.

FIG. 6 shows a system for deadlock detection according to the embodiments of the invention. As shown in the figure, the system comprises a recording module 601, a converting module 602, an establishing module 603, a lock graph constructing module 604, a deadlock detecting module 605 and a deadlock filtering module 606.

The recording module 601 is used for recording lock events during the operation of the parallel program and a first order relation among the lock events. The converting module 602 is used for converting information relevant to the operation of the parallel program into gate lock events and recording the gate lock events, wherein the information relevant to the operation of the parallel program is obtained by modifying codes of the parallel program and the information relevant to the operation of the parallel program at least includes one of thread relevant information and program logic relevant information; specifically, the converting module includes a sub-module for assigning a unique ID to each of the gate lock events and the lock events, and a sub-module for storing in the memory the lock events and the first order relation among the lock events as well as the gate lock events by using the assigned IDs. The establishing module 603 is used for establishing a second order relation among the gate lock events and lock events associated with the gate lock events, and adding the second order relation to the first order relation. The lock graph constructing module 604 is used for constructing a lock graph corresponding to the operation procedure of the parallel program based on the added first order relation. The deadlock detecting module 605 is used for performing deadlock detection on the constructed lock graph.

According to the embodiments of the invention, the system further comprises a deadlock filtering module 606 for filtering deadlock detection results based on the following rule: if it is detected that at least any two directed edges of a directed loop forming a deadlock share one gate lock, it is determined that the detected deadlock is not a true deadlock.

According to an embodiment of the invention, the information relevant to the0 operation of the parallel program comprises thread creation information including information of a parent thread and information of a child thread, wherein the establishing module 603 further comprises: a sub-module for acquiring by the parent thread a first set of lock events before creating the child thread; a sub-module for acquiring by the child thread a second set of lock events; a sub-module for acquiring a third set of lock events that is an intersection of the first set of lock events and the second set of lock events; and a sub-module for establishing an order relation among the thread creation information and the lock events in the third set of lock events.

According to an embodiment of the invention, the information relevant to the operation of the parallel program comprises thread identification information, wherein the establishing module 603 further comprises: a sub-module for establishing an order relation among the thread identification information and the lock events acquired by the threads identified by the thread identification information.

According to an embodiment of the invention, the information relevant to the operation of the parallel program comprises synchronization information among threads including information of a notification thread and information of a wait thread, wherein the establishing module 603 further comprises: a sub-module for acquiring a first set of lock events by the notification thread before issuing a notification; a sub-module for acquiring by the wait thread a second set of lock events after receiving the notification; a sub-module for acquiring a third set of lock events that is an intersection of the first set of lock events and the second set of lock events; and a sub-module for establishing an order relation among the synchronization information among threads and lock events in the third set of lock events.

According to an embodiment of the invention, the information relevant to the operation of the parallel program comprises program logic information, wherein the establishing module 603 further comprises: a sub-module for acquiring a first set of lock events by a portion of the parallel program that is executed first as determined by the program logic information; a sub-module for acquiring a second set of lock events by a portion of the parallel program that is executed later as determined by the program logic information; a sub-module for acquiring a third set of lock events that is an intersection of the first set of lock events and the second set of lock events; and a sub-module for establishing an order relation among the program logic information and lock events in the third set of lock events.

It should be appreciated that, at least some aspects of the invention can be alternatively implemented by program products. The program that defines the functions of the invention can be transmitted to a data storage system or a computer system over various signal carrier media, the signal carrier media including but not limited to, un-writable storage medium (e.g. CD-ROM), writable storage medium (e.g. floppy disk driver, hard disk driver, read/write CD ROM, optical medium) and communication medium such as computer and telephone network, including Ethernet. Therefore, it should be appreciated that, when computer readable instructions for managing the functions of the method of the invention are carried or encoded in such signal carrier media, they represent alternative embodiments of the invention. The invention can be implemented by hardware, software, firmware or a combination thereof. The invention can be implemented in a computer system in a collective manner, or in a distributed manner such that various components are distributed in a plurality of interconnected computer systems. Any computer system or any other device adapted to carry out the method described in the specification is appropriate. Preferably, the invention is implemented by the combination of computer software and general computer hardware, wherein, when the computer program is loaded and executed, the computer system is controlled to carry out the method of the invention or form the system of the invention.

For sake of illustration and explanation, preferred embodiments of the invention are described, but the disclosures thereof are not exhaustive and are not intended to limit the invention to the disclosed specific forms. Obviously, in view of the above teachings, many modifications and variations are possible, and such obvious modifications and variations for those skilled in the art are contained within the scope of the invention defined by the appending claims.

What is claimed is:

1. A method of deadlock detection in a parallel program comprising:
   recording lock events during operation of the parallel program and a first order relation among the lock events;
   converting information relevant to the operation of the parallel program into gate lock events and recording the gate lock events, wherein the information relevant to the operation of the parallel program includes at least one of thread relevant information and program logic relevant information;
   establishing a second order relation among the gate lock events and lock events associated with the gate lock events and adding the second order relation to the first order relation;
   constructing a lock graph corresponding to the operation procedure of the parallel program based on the added second order relation; and
   performing deadlock detection on the constructed lock graph, wherein the information relevant to the operation of the parallel program comprises thread creation information including information of a parent thread and information of a child thread, wherein establishing the second order relation among the gate lock events and lock events associated with the gate lock events further comprises:
   acquiring by the parent thread a first set of lock events before creating the child thread;

acquiring by the child thread a second set of lock events;
acquiring a third set of lock events that is an intersection of the first set of lock events and the second set of lock events; and
establishing an order relation among the thread creation information and the lock events in the third set of lock events.

2. The method of claim 1, wherein recording the gate lock events further comprises:
assigning unique IDs to the gate lock events; and storing the gate lock events in a memory by using the assigned IDs.

3. The method of claim 1 further comprising filtering deadlock detection results based on a following rule: if it is detected that at least any two directed edges of a directed loop forming a deadlock share one gate lock, it is determined that the detected deadlock is not a true deadlock.

4. The method of claim 1, wherein the information relevant to the operation of the parallel program comprises thread identification information, wherein establishing the second order relation among the gate lock events and lock events associated with the gate lock events further comprises: establishing an order relation among the thread identification information and the lock events acquired by the threads identified by the thread identification information.

5. The method of claim 1, wherein the information relevant to the operation of the parallel program comprises synchronization information among threads including information of a notification thread and information of a wait thread, wherein establishing the second order relation among the gate lock events and lock events associated with the gate lock events further comprises:
acquiring a first set of lock events by the notification thread before issuing a notification;
acquiring a second set of lock events by the wait thread after receiving the notification;
acquiring a third set of lock events that is an intersection of the first set of lock events and the second set of lock events; and
establishing an order relation among the synchronization information among threads and lock events in the third set of lock events.

6. The method of claim 1, wherein the information relevant to the operation of the parallel program comprises program logic information, wherein establishing the second order relation among the gate lock events and lock events associated with the gate locks event further comprises:
acquiring a first set of lock events by a portion of the parallel program that is executed first as determined by the program logic information;
acquiring a second set of lock events by a portion of the parallel program that is executed later as determined by the program logic information;
acquiring a third set of lock events that is an intersection of the first set of lock events and the second set of lock events; and
establishing an order relation among the program logic information and lock events in the third set of lock events.

7. The method of claim 1, wherein the information relevant to the operation of the parallel program is obtained by modifying codes of the parallel program.

8. A data processing system of deadlock detection in a parallel program comprising:
a recording module for recording lock events in a memory during the operation of the parallel program and a first order relation among the lock events;
a converting module for converting information relevant to the operation of the parallel program into gate lock events and recording the gate lock events in the memory, wherein the information relevant to the operation of the parallel program includes at least one of thread relevant information and program logic relevant information;
an establishing module for establishing a second order relation among the gate lock events and lock events associated with the gate lock events and adding the second order relation to the first order relation;
a lock graph constructing module for constructing a lock graph corresponding to the operation procedure of the parallel program based on the added second order relation; and
a deadlock detecting module for performing deadlock detection on the constructed lock graph, wherein the information relevant to the operation of the parallel program comprises synchronization information among threads including information of a notification thread and information of a wait thread, wherein the establishing module further comprises:
a sub-module for acquiring a first set of lock events by the notification thread before issuing a notification;
a sub-module for acquiring a second set of lock events by the wait thread after receiving the notification;
a sub-module for acquiring a third set of lock events that is an intersection of the first set of lock events and the second set of lock events; and
a sub-module for establishing an order relation among the synchronization information among threads and lock events in the third set of lock events.

9. The system of claim 8, wherein the converting module further comprises: a sub-module for assigning a unique ID to each of the gate lock events; and a sub-module for storing the gate lock events in the memory by using the assigned IDs.

10. The system of claim 8 further comprising a deadlock filtering module for filtering deadlock detection results based on a following rule: if it is detected that at least any two directed edges of a directed loop forming a deadlock share one gate lock, it is determined that the detected deadlock is not a true deadlock.

11. The system of claim 8, wherein the information relevant to the operation of the parallel program comprises thread creation information including information of a parent thread and information of a child thread, wherein the establishing module further comprises:
a sub-module for acquiring a first set of lock events by the parent thread before creating the child thread;
a sub-module for acquiring a second set of lock events by the child thread;
a sub-module for acquiring a third set of lock events that is an intersection of the first set of lock events and the second set of lock events; and
a sub-module for establishing an order relation among the thread creation information and the lock events in the third set of lock events.

12. The system of claim 8, wherein the information relevant to the operation of the parallel program comprises thread identification information, wherein the establishing module further comprises: a sub-module for establishing an order relation among the thread identification information and the lock events acquired by the threads identified by the thread identification information.

13. The system of claim 8, wherein the information relevant to the operation of the parallel program comprises program logic information, wherein the establishing module further comprises:

a sub-module for acquiring a first set of lock events by a portion of the parallel program that is executed first as determined by the program logic information;

a sub-module for acquiring a second set of lock events by a portion of the parallel program that is executed later as determined by the program logic information;

a sub-module for acquiring a third set of lock events that is an intersection of the first set of lock events and the second set of lock events; and a sub-module for establishing an order relation among the program logic information and lock events in the third set of lock events.

14. The system of claim 8, wherein the information relevant to the operation of the parallel program is obtained by modifying codes of the parallel program.

15. A computer program product stored in a non-transitory computer-recordable media for deadlock detection in a parallel program, said computer program product comprising instructions operable by a data processing system for performing the steps of:

recording lock events during operation of the parallel program and a first order relation among the lock events;

converting information relevant to the operation of the parallel program into gate lock events and recording the gate lock events;

establishing a second order relation among the gate lock events and lock events associated with the gate lock events and adding the second order relation to the first order relation;

constructing a lock graph corresponding to the operation procedure of the parallel program based on the added second order relation; and performing deadlock detection on the constructed lock graph, wherein the information relevant to the operation of the parallel program comprises program logic information, wherein establishing the second order relation among the gate lock events and lock events associated with the gate locks event further comprises:

acquiring a first set of lock events by a portion of the parallel program that is executed first as determined by the program logic information;

acquiring a second set of lock events by a portion of the parallel program that is executed later as determined by the program logic information;

acquiring a third set of lock events that is an intersection of the first set of lock events and the second set of lock events; and establishing an order relation among the program logic information and lock events in the third set of lock events.

* * * * *